(12) United States Patent
Su et al.

(10) Patent No.: US 11,508,156 B2
(45) Date of Patent: Nov. 22, 2022

(54) VEHICULAR VISION SYSTEM WITH ENHANCED RANGE FOR PEDESTRIAN DETECTION

(71) Applicant: Magna Electronics Inc., Auburn Hills, MI (US)

(72) Inventors: Tzu-Ming Su, Taichung (TW); I-Te Yu, Zhubei (TW); Brijendra Kumar Bharti, Brampton (CA); Alexander Velichko, Toronto (CA); Nikhil Gupta, Brampton (CA); Xai Phan, Mississauga (CA); Nadine A. Hazzouri, Mississauga (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 70 days.

(21) Appl. No.: 17/247,632

(22) Filed: Dec. 18, 2020

(65) Prior Publication Data

US 2021/0201049 A1     Jul. 1, 2021

Related U.S. Application Data

(60) Provisional application No. 62/991,760, filed on Mar. 19, 2020, provisional application No. 62/954,853, (Continued)

(51) Int. Cl.
*G06V 20/56*     (2022.01)
*G06T 7/70*     (2017.01)
(Continued)

(52) U.S. Cl.
CPC .......... *G06V 20/56* (2022.01); *G06K 9/6269* (2013.01); *G06T 7/70* (2017.01); *G06V 10/255* (2022.01);
(Continued)

(58) Field of Classification Search
CPC ...... G06V 20/58; G06V 20/588; G06V 20/56; G06V 10/40; G06V 20/20; G06V 10/00;
(Continued)

(56) References Cited

U.S. PATENT DOCUMENTS

| 5,550,677 A | 8/1996 | Schofield et al. |
| 5,670,935 A | 9/1997 | Schofield et al. |

(Continued)

OTHER PUBLICATIONS

Pedestrian Detection: A Benchmark—2009 (Year: 2009).*
(Continued)

*Primary Examiner* — Nizar N Sivji
(74) *Attorney, Agent, or Firm* — Honigman LLP (57) ABSTRACT

A vision system for a vehicle includes a camera and an electronic control unit (ECU) with an image processor. The ECU generates a reduced resolution frame of captured image data and the ECU determines a reduced resolution detection result based on pedestrian detection using the reduced resolution frame of captured image data. The ECU, responsive to processing by the image processor of image data, generates a cropped frame of captured image data and the ECU determines a cropped detection result based on pedestrian detection using the cropped frame of captured image data. Responsive to determining the reduced resolution detection result and determining the cropped detection result, the ECU merges the reduced resolution detection result and the cropped detection result into a final pedestrian detection result. The final pedestrian detection result is indicative of presence of a pedestrian within the field of view of the camera.

9 Claims, 10 Drawing Sheets

Related U.S. Application Data filed on Dec. 30, 2019, provisional application No. 62/954,008, filed on Dec. 27, 2019.

(51) Int. Cl.
*G06K 9/62* (2022.01)
*G06V 10/20* (2022.01)
*G06V 20/40* (2022.01)
*G06V 40/10* (2022.01)

(52) U.S. Cl.
CPC .............. *G06V 20/46* (2022.01); *G06V 40/10* (2022.01); *G06T 2207/30196* (2013.01); *G06T 2207/30252* (2013.01); *G06T 2210/22* (2013.01)

(58) Field of Classification Search
CPC ...... G06V 10/255; G06V 20/46; G06V 40/10; G06V 30/2504; G06T 2207/30261; G06T 2207/30252; G06T 7/579; G06T 2207/30196; G06T 2207/30244; G06T 7/11; G06T 7/80; G06T 7/70; G06T 2210/22; G06T 2207/20016; G06K 9/6269; G06K 9/6267; G06K 9/627
See application file for complete search history.

(56) References Cited

U.S. PATENT DOCUMENTS

| | | |
|---|---|---|
| 5,949,331 A | 9/1999 | Schofield et al. |
| 6,690,268 B2 | 2/2004 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 7,872,764 B2 | 1/2011 | Higgins-Luthman et al. |
| 7,914,187 B2 | 3/2011 | Higgins-Luthman et al. |
| 8,017,898 B2 | 9/2011 | Lu et al. |
| 8,027,029 B2 | 9/2011 | Lu et al. |
| 8,376,595 B2 | 2/2013 | Higgins-Luthman |
| 8,446,470 B2 | 5/2013 | Lu et al. |
| 8,451,107 B2 | 5/2013 | Lu et al. |
| 9,036,026 B2 | 5/2015 | Dellantoni et al. |
| 9,126,525 B2 | 9/2015 | Lynam et al. |
| 9,509,957 B2 | 11/2016 | Higgins-Luthman et al. |
| 9,547,795 B2 | 1/2017 | Gupta |
| 9,898,671 B2 | 2/2018 | Gupta et al. |
| 9,900,490 B2 | 2/2018 | Ihlenburg et al. |
| 10,071,687 B2 | 9/2018 | Ihlenburg et al. |
| 10,095,935 B2 | 10/2018 | Gupta |
| 10,099,614 B2 | 10/2018 | Diessner |
| 10,204,279 B2 | 2/2019 | Gupta et al. |
| 10,713,506 B2 | 7/2020 | Gupta et al. |
| 2010/0020170 A1 | 1/2010 | Higgins-Luthman et al. |
| 2010/0067740 A1* | 3/2010 | Hayasaka .............. G06V 40/10 382/218 |
| 2010/0202657 A1* | 8/2010 | Salgian ................ G06V 40/103 382/199 |
| 2011/0255741 A1* | 10/2011 | Jung ...................... G06V 20/58 382/103 |
| 2015/0178576 A1* | 6/2015 | Gupta .................... G06V 20/58 348/148 |
| 2015/0281587 A1* | 10/2015 | Furuta .................. G06V 10/147 348/240.2 |
| 2016/0180158 A1* | 6/2016 | Gupta .................... G06V 40/10 348/148 |
| 2017/0032676 A1* | 2/2017 | Mesmakhosroshahi ..................... G06V 40/103 |
| 2017/0368993 A1* | 12/2017 | Imura ...................... H04N 7/18 |
| 2019/0259284 A1* | 8/2019 | Khadloya ............ G06K 9/6256 |
| 2021/0174100 A1* | 6/2021 | Nix ........................ G06V 20/58 |
| 2021/0264224 A1* | 8/2021 | Tamaoki ............... G01S 13/867 |

OTHER PUBLICATIONS

Detection of Traffic Violations of Road Users Based on Convolutional Neural Networks—2018 (Year: 2018).*

Pedestrian Detection in Automotive Safety: Understanding State-of-the-Art—2019 (Year: 2019).*

* cited by examiner

VEHICULAR VISION SYSTEM WITH ENHANCED RANGE FOR PEDESTRIAN DETECTION

CROSS REFERENCE TO RELATED APPLICATIONS

The present application claims the filing benefits of U.S. provisional application Ser. No. 62/991,760, filed Mar. 19, 2020, U.S. provisional application Ser. No. 62/954,853, filed Dec. 30, 2019, and U.S. provisional application Ser. No. 62/954,008, filed Dec. 27, 2019, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides an electronic control unit (ECU) comprising electronic circuitry and associated software. The electronic circuitry of the ECU includes an image processor for processing frames of image data captured by the camera to detect presence of objects in the field of view of the camera. The ECU, responsive to processing by the image processor of a frame of image data captured by the camera, generates a reduced resolution frame of captured image data that has a reduced resolution as compared to a resolution of the captured frame of image data and the ECU determines a reduced resolution detection result based on pedestrian detection using the reduced resolution frame of captured image data. The ECU, responsive to processing by the image processor of the captured frame of image data, generates a cropped frame of captured image data. The ECU determines a cropped detection result based on pedestrian detection using the cropped frame of captured image data and the ECU merges the reduced resolution detection result and the cropped detection result and generates a final detection result that is indicative of presence of a pedestrian within the frame of captured image data.

In another aspect of the invention, a driver assistance system or vision system or imaging system for a vehicle that utilizes one or more cameras to capture image data representative of images exterior of the vehicle, and provides an ECU comprising electronic circuitry and associated software. The electronic circuitry of the ECU includes an image processor for processing frames of image data captured by the camera to detect presence of objects in the field of view of the camera. The ECU, responsive to detecting presence of at least one object via processing by the image processor of image data captured by the camera, determines whether any pedestrian candidate regions are present within a frame of captured image data. The ECU generates at least one cropped image portion from the frame of captured image data and the ECU generates an enlarged cropped image for each of the at least one cropped image portion that has an increased resolution as compared to the resolution of the respective cropped image portion. The ECU, via processing by the image processor of the at least one enlarged cropped image, determines whether any pedestrian candidate regions are present in any of the at least one enlarged cropped image. The ECU determines that a pedestrian is present within the frame of captured image data responsive to determining that a pedestrian candidate region is present within the frame of captured image data or that a pedestrian candidate region is present within one or more of the at least one enlarged cropped image.

In another aspect of the invention, a driver assistance system or vision system or imaging system for a vehicle that utilizes one or more cameras to capture image data representative of images exterior of the vehicle, and provides an ECU comprising electronic circuitry and associated software. The electronic circuitry of the ECU includes an image processor for processing frames of image data captured by the camera to detect presence of objects in the field of view of the camera. The ECU, responsive to detecting presence of one or more objects via processing by the image processor of image data captured by the camera, determines one or more regions of interest within a frame of captured image data. The ECU generates an enlarged region of interest for each of the regions of interest of the determined one or more regions of interest and the ECU performs pedestrian detection on each enlarged region of interest to determine whether a pedestrian is present in the associated region of interest.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
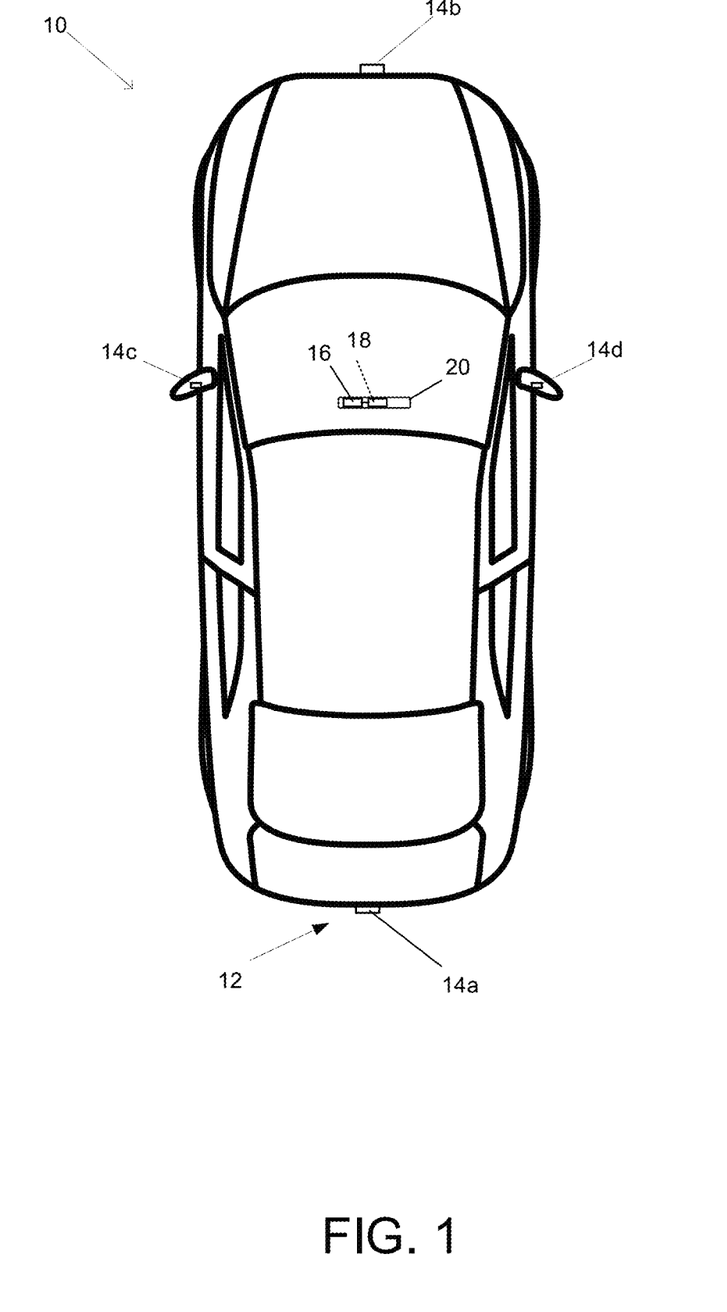
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Image sensors have long been employed in automotive applications to detect objects, avoid collision, and assist drivers for driving maneuvers such as parking. Fisheye image sensors are typically used to capture images with wide field of view (e.g., 180 degrees), and then transform the original fisheye images to undistorted images for a further detection phase. When using an image as input for object detection, the amount of pixels in a region of interest (ROI) affects detection range (i.e., how far from the camera an object can be detected). For example, an object within an ROI with more pixels within it (i.e., greater resolution) may be detected at a distance further away than an object within an ROI (of the same size as the first ROI) with less pixels (i.e., less resolution). Thus, an object detection system has a longer and wider detection range when using high-resolution image data or images.

However, using high resolution images as a direct image input has significant drawbacks. For example, an image data buffer that stores images captured from a 1 megapixel (MP) sensor would require 4× more storage size than an image buffer Video Graphics Array (VGA) sensor (i.e., 640×480 pixels). In another example, high resolution sensors require larger bandwidth and more powerful image processor or image signal processor (ISP) for the higher resolution input. In yet another example, using high-resolution image directly greatly increases the amount of candidate ROIs and thus significantly decreases the frames per second (FPS) that a detection module can process.

The task of pedestrian detection (i.e., object detection for pedestrians) and rear autonomous emergency braking (AEB) has a great importance among car manufacturers. The expense of sensors and hardware, however, limits the success of solutions in the market.

In accordance with an aspect of the present invention, a vehicle vision system performs object detection using a fusion of a VGA and a MP image. The system includes an image data buffer that is sized to fit VGA images. The image buffer stores images from the fusion. That is, each storage location of the image data buffer is sized to fit the VGA image and not the MP image (i.e., the MP image is too large for the image buffer). The system is capable of performing object detection using a VGA sized image buffer while achieving performance at or near a MP sized image buffer. In some aspects, the system first performs object detection on a cropped high resolution (i.e., MP) image and then performs object detection on a low resolution (i.e., VGA) image normally, which allows for less storage than storing the high resolution image (e.g., four times less storage for an MP image) and allows for much faster processing. That is, the system performs two detection steps: one detection step using a low resolution image detection and one detection step using a cropped high resolution image detection. For example, the camera may capture a frame of high resolution image data and, for the low resolution detection, the system may resize or downscale the input high resolution image to a lower resolution (e.g., VGA at 640×480 or any other size) and run pedestrian detection (PD) on the resized image to get PD candidates.

Figure 2:
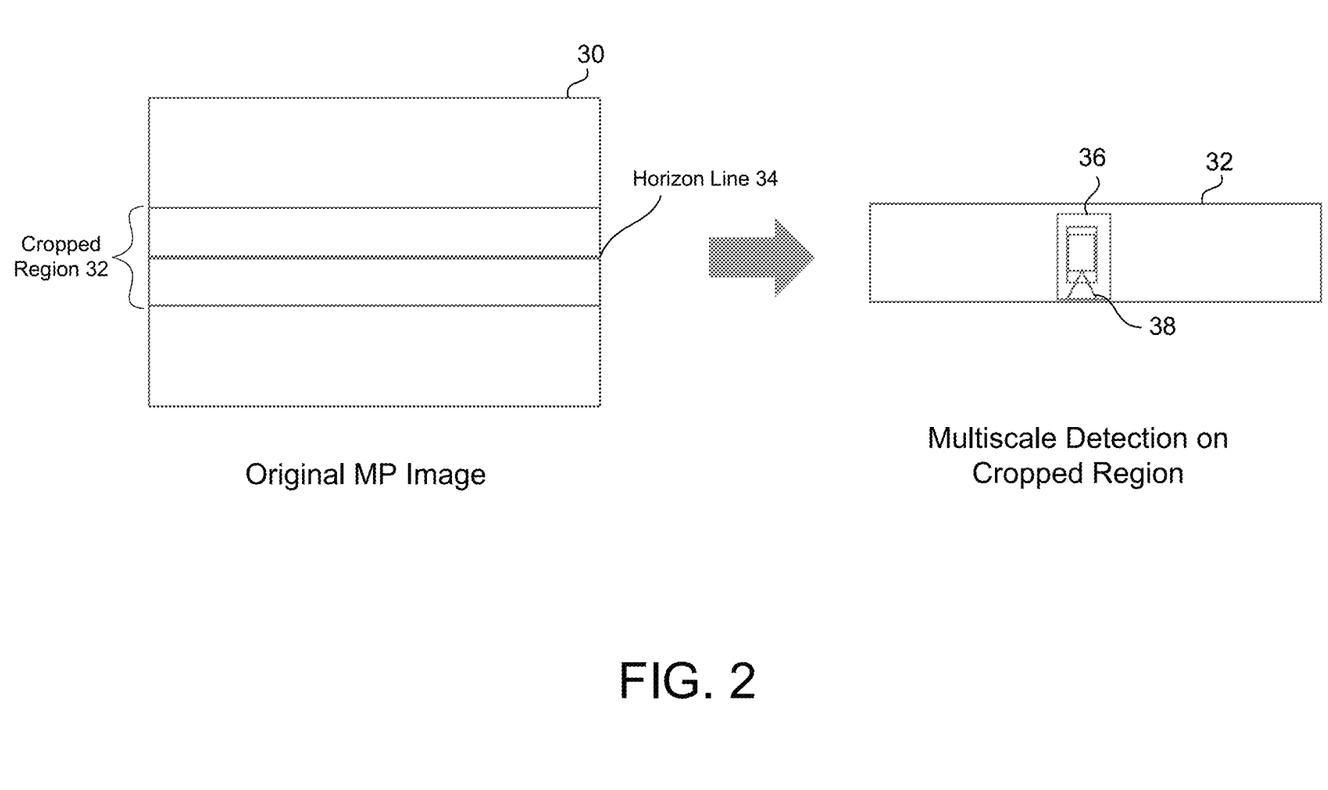
FIG. 2 is a schematic view of an original megapixel (MP) image cropped to produce a cropped image.

Referring now to FIG. 2, for the high resolution or MP detection step, the system may crop the MP image 30 with a ROI size (e.g., 1280×200 pixels or any other size) from a center part of the MP image 30 input and only process the cropped image 32 for PD candidates in this range. The cropped image 32 may correspond to an area more likely to have a pedestrian or an area where the vehicle is more likely to collide with a pedestrian. The cropped region 32 may be centered around the horizon line 34. The system may perform multiscale pedestrian detection on the cropped image 32 to determine one or more PD candidate positions 36 and an object detection result 38. That is, the system may crop the high resolution image such that the cropped image corresponds to an area of the high resolution image that is most likely to include pedestrians (e.g., the horizon).

Figure 3:
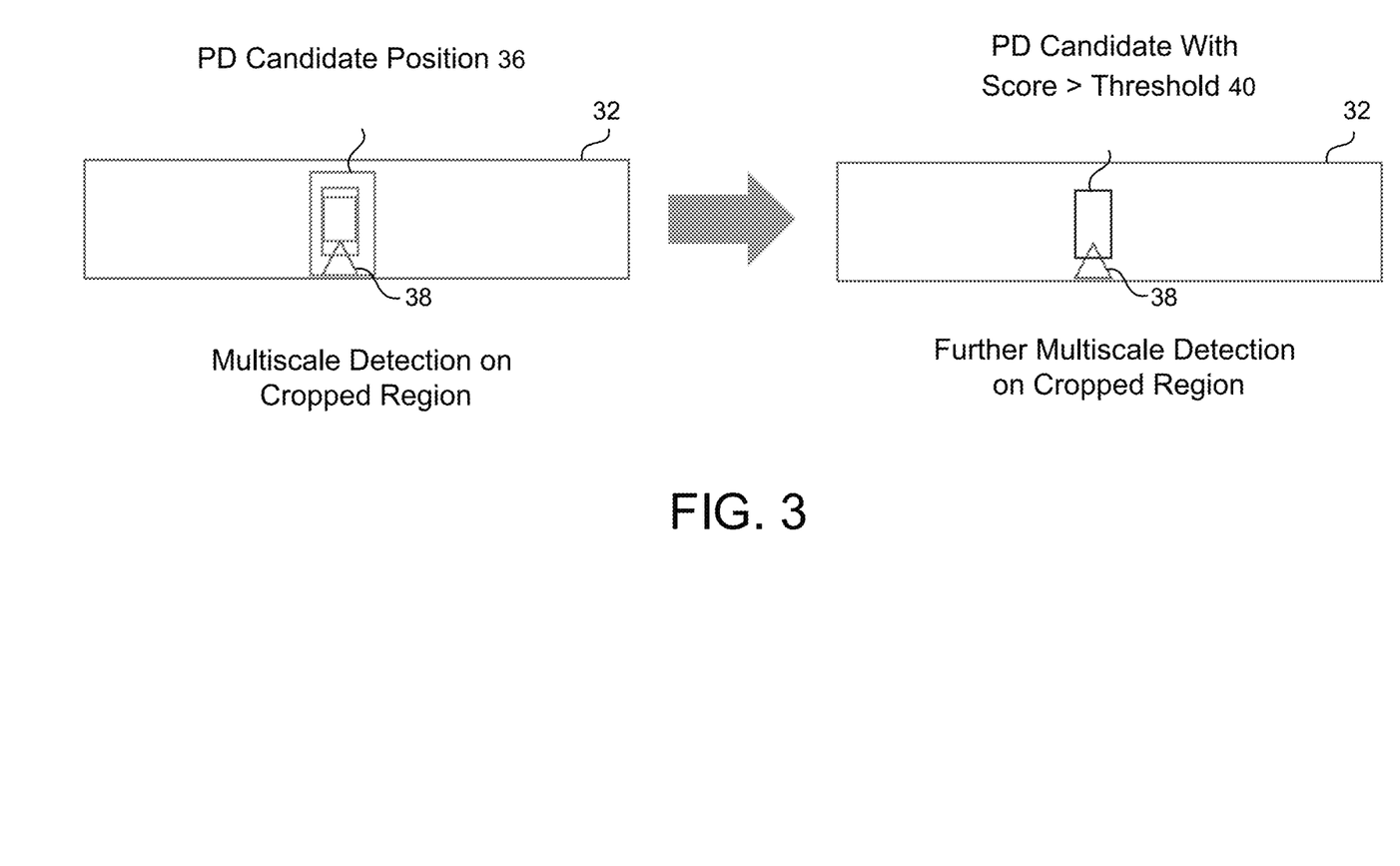
FIG. 3 is a schematic view of multiscale detection on the cropped image of FIG. 2.

Referring now to FIG. 3, the system may perform further multiscale detection on the cropped region 32. For example, the system 12 may score each PD candidate position 36 and identify PD candidate positions 36 with a score greater than a threshold score. The score may represent a likelihood that the PD candidate position includes a pedestrian.

Figure 4:
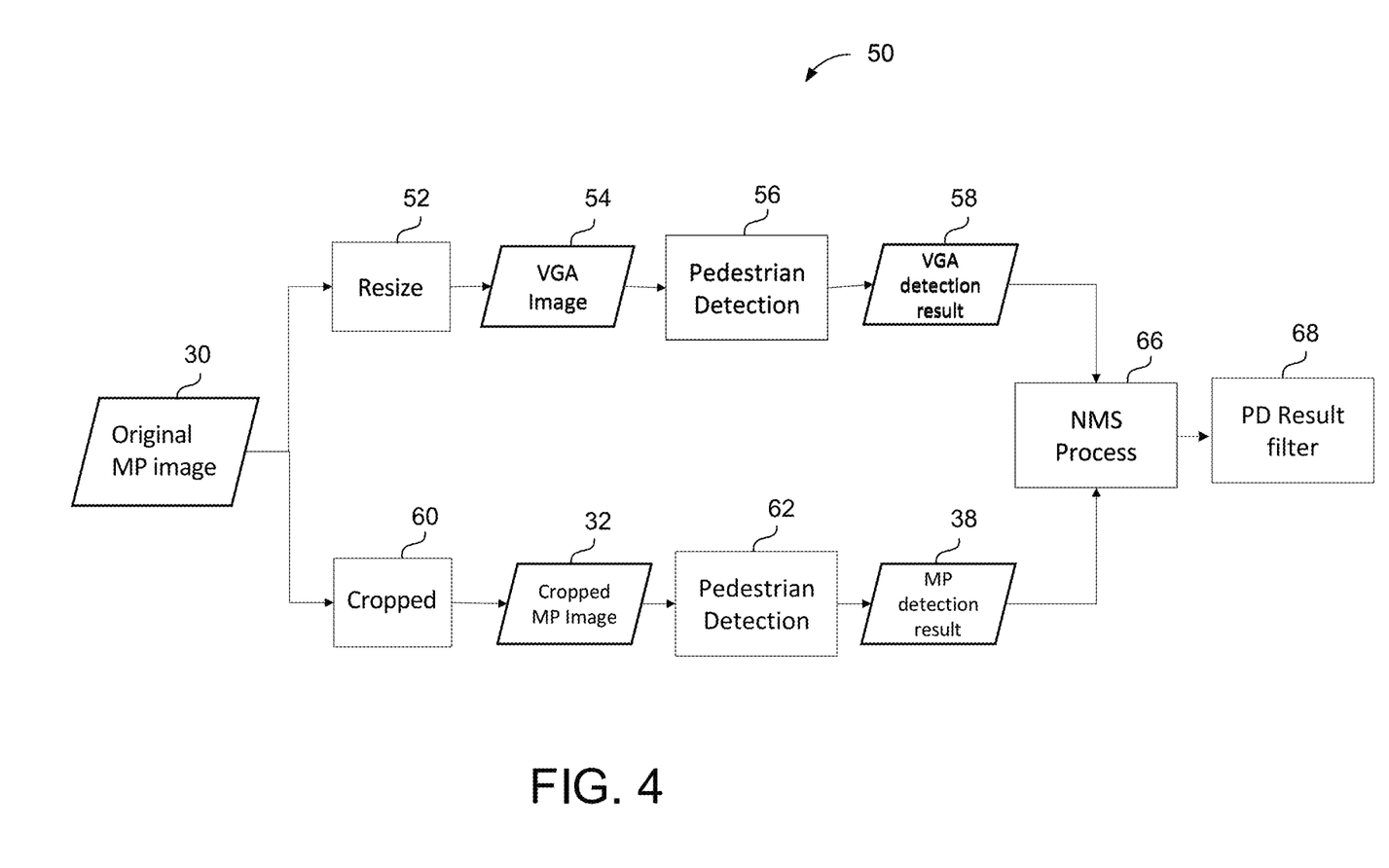
FIG. 4 is an example flow chart of the vision system of FIG. 1 in accordance with the present invention.

Referring now to FIG. 4, a flow chart 50 illustrates the flow for the original high resolution or MP image 30. During the low resolution or VGA detection step, the high resolution or MP image 30 is resized at step 52 to a VGA image 54. The system performs pedestrian detection on the VGA image 54 at step 56 to produce a VGA detection result 58. During the high resolution or MP detection step (which may be executed in parallel with the VGA detection step, before the VGA detection step, or after the VGA detection step), the MP image 30 is cropped at step 60. The system performs pedestrian detection on the cropped MP image 32 at step 62 to produce the MP detection result 32. At step 66, a non-maximum suppression (NMS) technique may be used to merge the results 38, 58 separately. The results of the merging may be passed to a PD result filter 68 to determine the final detection results.

The examples herein discuss a 1 megapixel image and a VGA image (i.e., 640×480), however it is understood that any sized images may be used. That is, any sized image captured by a camera may be reduced/downscaled and cropped to any sized image that is smaller than the original image and still be within the scope and spirit of the invention. For example, a 4 MP original image may be reduced and cropped to a 1 MP image. The system may reduce (i.e., downscale) any higher resolution image to any lower resolution image. For example, the system may use a filter to reduce the resolution of the high resolution image to the low resolution image or any other conventional downscaling techniques.

Thus, the vehicle vision system may provide performance which approaches accuracy of detection on an MP image directly with the processing speed near that of a VGA image. Enhancements provided by the vision system allows for efficient detection using high resolution images with low computation complexity. The enhancements also reduce the storage requirements to levels comparable with VGA detection systems. That is, the vision system may have approximately the same memory usage and computation complexity while achieving the performance approaching detection on an entire high resolution image. The system also reduces the requirement of system bandwidth because of the small working buffer. The system may be used to increase the range of detection for all 2-D and 3-D objects, e.g., vehicles, bicycles, trailers, road markings, traffic lights, traffic signs, etc.

Cameras are now increasingly used for automotive applications such as surround-views, object detection methods, collision avoidance, and to safely assist drivers while driving. Fisheye lens image sensors are generally used to capture an image with a wide field of view (FOV), and then the vision system transforms the original fisheye image to an undistorted image for an object detection phase. Camera resolution is the key factor in determining the range of object detection. That is, higher resolution provides clearer and more detailed information and leads to a greater detection range (i.e., objects further from the vehicle may be detected).

However, while higher resolution leads to a greater detection range, there are significant drawbacks of high resolution general detection. Higher resolution requires larger memory space and bandwidth to store the captured images, which leads to higher hardware cost (i.e., cost of the camera and operating hardware system). Higher resolution also typically means a larger number of pixels must be analyzed in different processes, such as for image signal processing (ISP) and detection which incurs a greater computational penalty in a tradeoff for detection range. The heavy computation causes longer system operating time and lower down sensitivity of the system. Additional pixels also means higher chances for the detection algorithm to generate an incorrect result which may lead to additional false alarms for general detection.

General detection is critical for collision avoidance related functions, such as autonomous emergency braking (AEB) or more integrated functions such as autonomous parking assistance. The need for minimal cost of sensors and hardware has been limiting the success of solutions in the market. Implementations herein include a novel vision system that may perform detection on an entirety of a higher resolution image resized to lower resolution and perform detection again with several zoom-in partial images of the high resolution image.

An aspect of the vision system reduces storage requirements for image data (versus using just a high resolution image) by, for example, a factor of four or more and greatly reduces processing overhead while providing performance that approaches detection on a high resolution image directly. That is, the vision system, in some implementations, detects objects within camera's FOV using a lower resolution camera and/or less hardware but with the detection range of higher resolution camera. The enhanced pedestrian detection of the vision system may be used to improve image based general detection functions, including front camera and surround views, which may assist in collision avoiding and auto-parking. The vision system is capable of using several additional zoom-in regions of an image captured by a low resolution camera and gather additional detail from the zoom-in regions to detect pedestrians, thereby increasing detection range.

In some aspects, the vision system 12 is operable to perform two steps in a detection phase. The first step is for detection on an entire image while the second step is for detection on zoom-in views on partial portions of the low resolution image. The image used for detection may either be a high resolution image or a low resolution image (e.g., megapixel (MP) image or VGA image). For example, when a high resolution camera and the associated hardware is equipped at the vehicle, the vision system 12 may perform detection on the high resolution image and exceed the detection range of typical vision systems using a similar high resolution image. In another example, when a high resolution camera is available, but the associated hardware is not (i.e., the processing hardware is not sufficiently powerful to adequately process the high resolution image), the vision system 12 may receive a high resolution image and resize the high resolution image to a low resolution image while still maintaining comparable detection distance to a typical vision system performing detection on a high resolution image. In yet another example, the vision system 12 may receive a low resolution image (i.e., from a low resolution camera) and perform detection on the image without resizing the image while achieving comparable detection distance to a typical vision system performing detection on a high resolution image.

Figure 5:
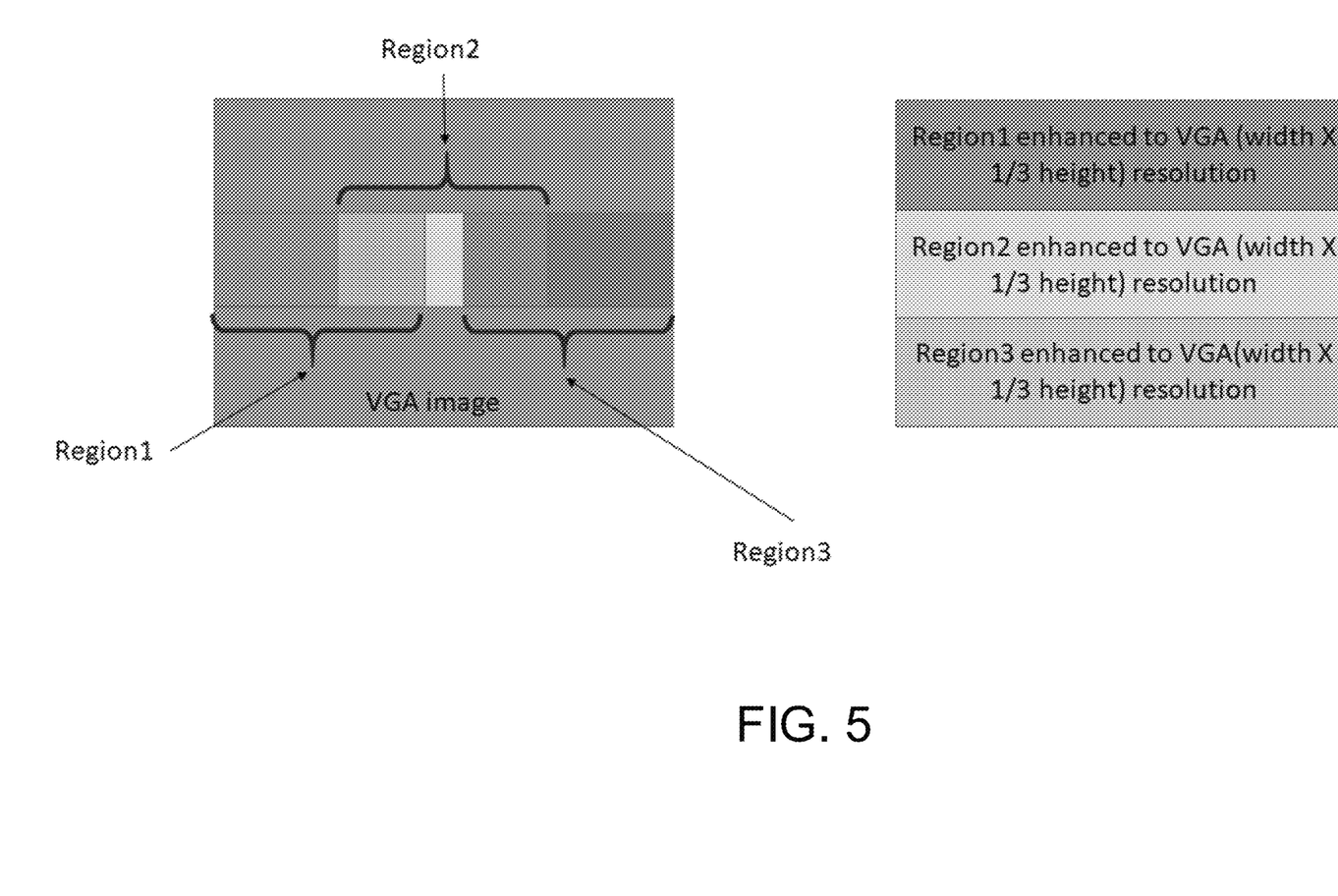
FIG. 5 is schematic view of a frame of captured image data cropped into a plurality of regions in accordance with the present invention.

During the first step the vision system performs whole image detection on the original frame of captured image data, and the vision system attempts to determine one or more pedestrian detection (PD) candidate regions anywhere within the frame. Referring now to FIG. 5, the vision system also crops the image based on pre-set view angles. Optionally, three regions may be enhanced/enlarged. The three regions may include a center third of the frame of image data. For example, as illustrated in FIG. 5, a first region in the center left of the image may be cropped and enhanced to VGA resolution (width×⅓ height) while a second region in the center may be cropped and enhanced to VGA resolution (width×⅓ height) and a third region in the center right may be cropped and enhanced to VGA resolution (width×⅓ height). That is, the system may crop the image to each respective regions, and then upscale (e.g., via interpolation) each region to a higher resolution.

Figure 6:
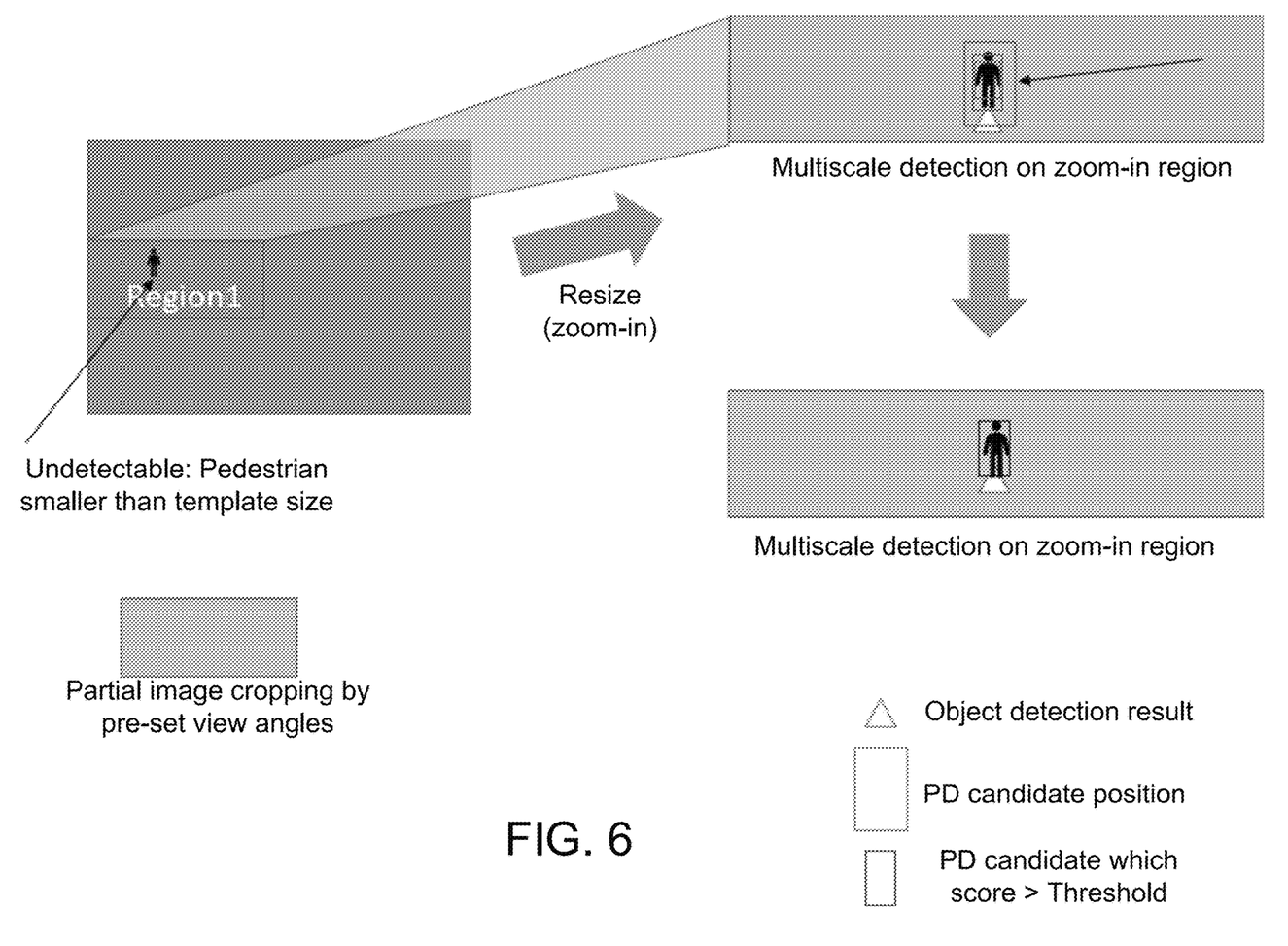
FIG. 6 is a schematic view of a frame of captured image data with a cropped and resized portion for performing pedestrian detection.

Referring now to FIG. 6, the vision system resizes the cropped images to a larger size (e.g., VGA resolution) and then reruns pedestrian detection on each of the larger cropped images (i.e., regions). The result of this pedestrian detection may detect pedestrians not detected in whole image pedestrian detection due to the pedestrian being smaller than the template size. When enlarging/upscaling the cropped image, the pedestrian similarly increases in size, which may then exceed the template size and allow detection. The vision system may perform multiscale detection on each enlarged and cropped image (i.e., each region) and determine whether a region is a PD candidate region when a score from the multiscale detection exceeds a threshold.

Figure 7:
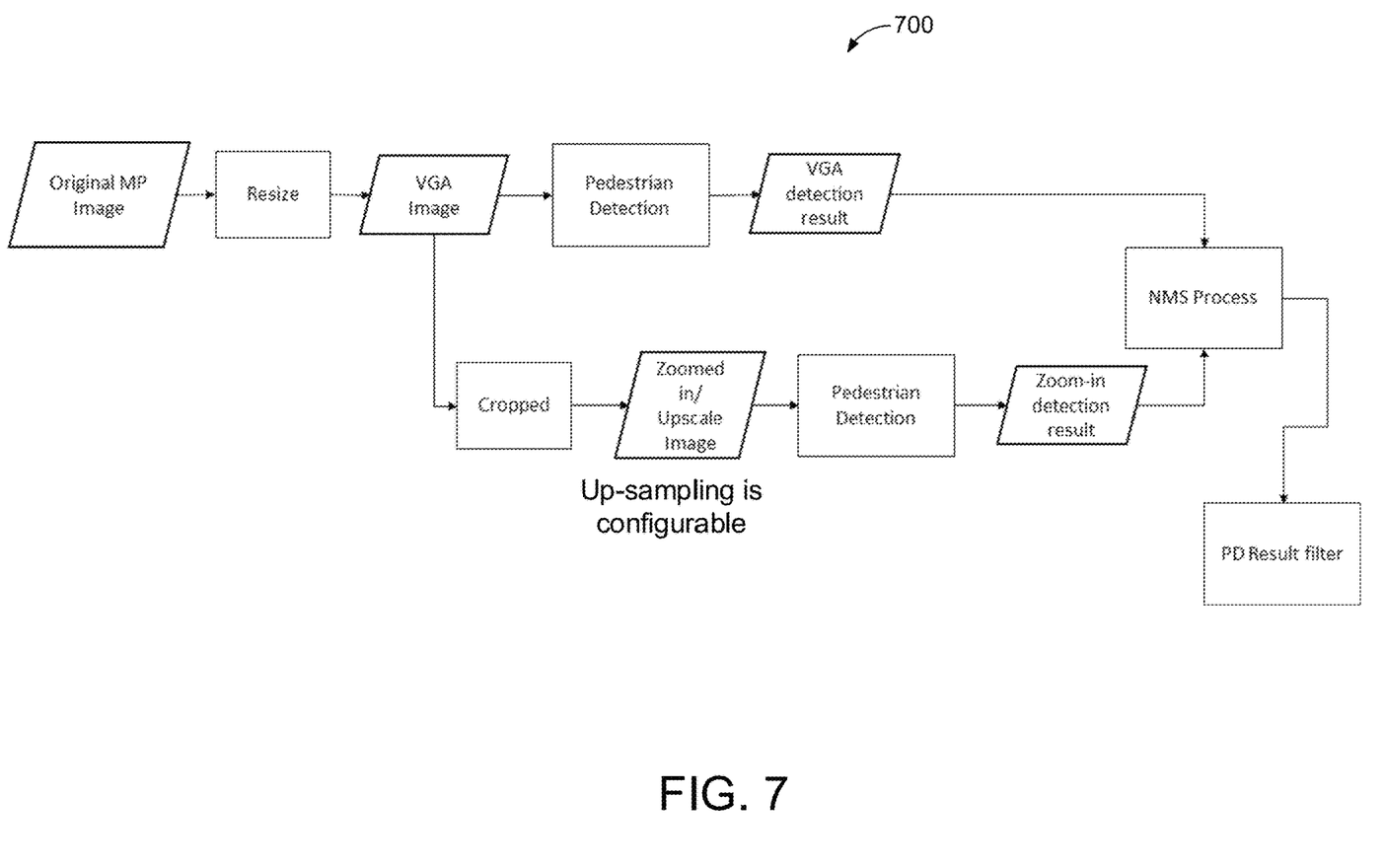
FIG. 7 is another example flow chart for the vision system of FIG. 1 with enhanced pedestrian detection in accordance with the present invention.

FIG. 7 illustrates an exemplary flow chart 700 for the vision system 12. In this example, the system receives a high resolution image (e.g., an MP image) and resizes the MP image to a lower resolution (e.g., a VGA image). The vision system performs pedestrian detection on the resized image to obtain a VGA detection result. In a further step, the vision system crops the resized VGA image into one or more cropped images and then resizes each cropped image to a larger size (e.g., to VGA resolution). The size that each image is resized to may be configurable or adjustable. Each cropped image may be resized to the same size or to different sizes based on location. The vision system again performs pedestrian detection on each of the upscaled image portions to receive a zoom-in detection result. The vision system uses a non-maximum suppression (NMS) process to merge the VGA detection result from the first step and the zoom-in detection result from the second step. A PD result filter may determine which PD candidate regions are pedestrians based on a score for each region exceeding a threshold.

Thus, the vision system of the present invention provides detection on one or more zoomed-in/upscaled images or image portions or regions in addition to standard detection over the entire image frame to enable farther detection range that would otherwise be limited by camera resolution. Detection on zoomed-in images does not require a higher camera resolution, which reduces hardware costs. Additionally, the vision system is extendable for any camera resolution as higher camera resolutions will lead to a corresponding increase in detection range. The vision system, while using approximately the same amount of memory and computation, achieves a detection range on zoomed-in images that approaches typical systems performing detection directly on a high resolution image. The vision system may be used to increase the range of detection for all two dimensional (2-D) and three dimensional (3-D) objects (e.g., vehicles, bicycles, trailers, road markings, traffic lights, traffic signs, etc.). Thus, detection on zoom-in images may have better detection with lower a resolution camera and less costly hardware while still maintaining the system operation speed.

Image sensors (e.g., cameras) have long been employed in automotive applications to detect objects, provide surround views, avoid collisions, and assist drivers for driving maneuvers, such as parking. Fisheye image sensors are typically used to capture images with a wide field of view (e.g., 180 degrees), and then transform the original fisheye images to undistorted images for a further detection phase. General detection using cameras uses the information captured by the camera to provide localizations of objects within the field of view of the camera. When using an image as input for object detection, the amount of pixels in a region of interest (ROI) affects the detection range (i.e., how far from the camera an object can be detected). For example, an object within an ROI with more pixels within it (i.e., greater resolution) may be detected at a distance further away than an object within an ROI (of the same size as the first ROI) with less pixels (i.e., less resolution). Thus, an object detection system has a longer and wider detection range when using high-resolution image data or images.

However, using high resolution images as a direct image input has significant drawbacks. For example, the camera and associated hardware system are typically higher cost. In another example, high resolution sensors require larger bandwidth and more powerful image processor or image signal processor (ISP) for the higher resolution input. In yet another example, using high-resolution image directly greatly increases the amount of candidate ROIs and the number of pixels that must be analyzed and thus significantly decreases the frames per second (FPS) that a detection module can process. That is, there is a tradeoff between computational penalty and detection range. In yet another example, an increase in pixels also increases chances for the detection algorithm to have incorrect results, which may lead to an increase in false alarms of general detection.

General object detection is critical for collision avoiding related functions, such as autonomous emergency braking, or more integrated functions such as autonomous parking assistance. The range of detection impacts the level of safety of these collision avoiding functions. Detection range relies on the resolution of camera, but with higher resolution comes higher cost of hardware and higher computation time. Thus, it is desirable to lower cost and increase computational speed while increasing detection range.

In accordance with an aspect of the present invention, a vehicle vision system detects objects within the field of view (FOV) of a lower resolution camera. For example, the system performs enhanced pedestrian detection used to improve image-based general detection functions, which may include front (forward viewing) camera and surround views, and which may help in collision avoidance and auto-parking. The system may use a small localized region of interest (ROI) instead of the entire frame of captured image data and detect presence of a pedestrian just within the ROI (as opposed to the entire image) to increase pedestrian detection range. The system allows for lower resolution and decreased hardware cost while also maintaining speed of operation and increasing detection performance.

General detection (GD) may operate on the principle of structure by motion detection and gives a good range of detection of an object. Ground detection provides a ground point of all 3D objects in the scene (i.e., within the field of view of the camera). However, GD often experiences limitations in recognizing the detected object. Pedestrian detection (PD) is often based on the support vector machine classification. Pedestrian detection may detect and identify or classify pedestrians from other objects detected within the field of view of the camera by working on a minimum template size of an object which causes a restriction on the detection range (as a pedestrian that is too far away is smaller than the template size). The system may use an initial point of detection determined from GD and enlarge the local area around the GD point to look for a pedestrian by enhancing the image to the minimum pedestrian template size.

Object detection (e.g., pedestrian detection) is limited by the size of object and thus, the smaller the object, the more difficult the object is to detect. The system may apply image pyramids to detect objects with various sizes. While the system may enlarge an image captured by the camera to get a larger target size, this approach has two main drawbacks. First, the system would require more memory space, which corresponds to higher system cost. Second, the system would require additional time to scan the entire image.

Instead of enlarging the entire image, the system performs local enhancement of regions of the image. That is, the system may enlarge portions or regions of the image that are of particular interest (i.e., ROIs). The size of each ROI is smaller than the entire image and thus reduces memory requirements. For example, it may be more desirable to enhance the portions of the ROI that correspond with distances farther from the vehicle. Because the region of enhanced detection is relatively small (compared to the entire image), the effect on computation time is far smaller than enlarging the entire image.

To enlarge a region, the system may perform additional or enhanced processing of the image data at the associated region. For example, the system may initially process the region at a first resolution, and then perform enhanced processing at a second resolution that is greater than the first resolution. The system may increase the resolution through interpolation (i.e., digital zoom or upscaling). They system may also initially process the image at a lower resolution than captured by the camera. Pedestrian detection may be applied only on portions of each ROI that are desired to be enhanced.

Figure 8:
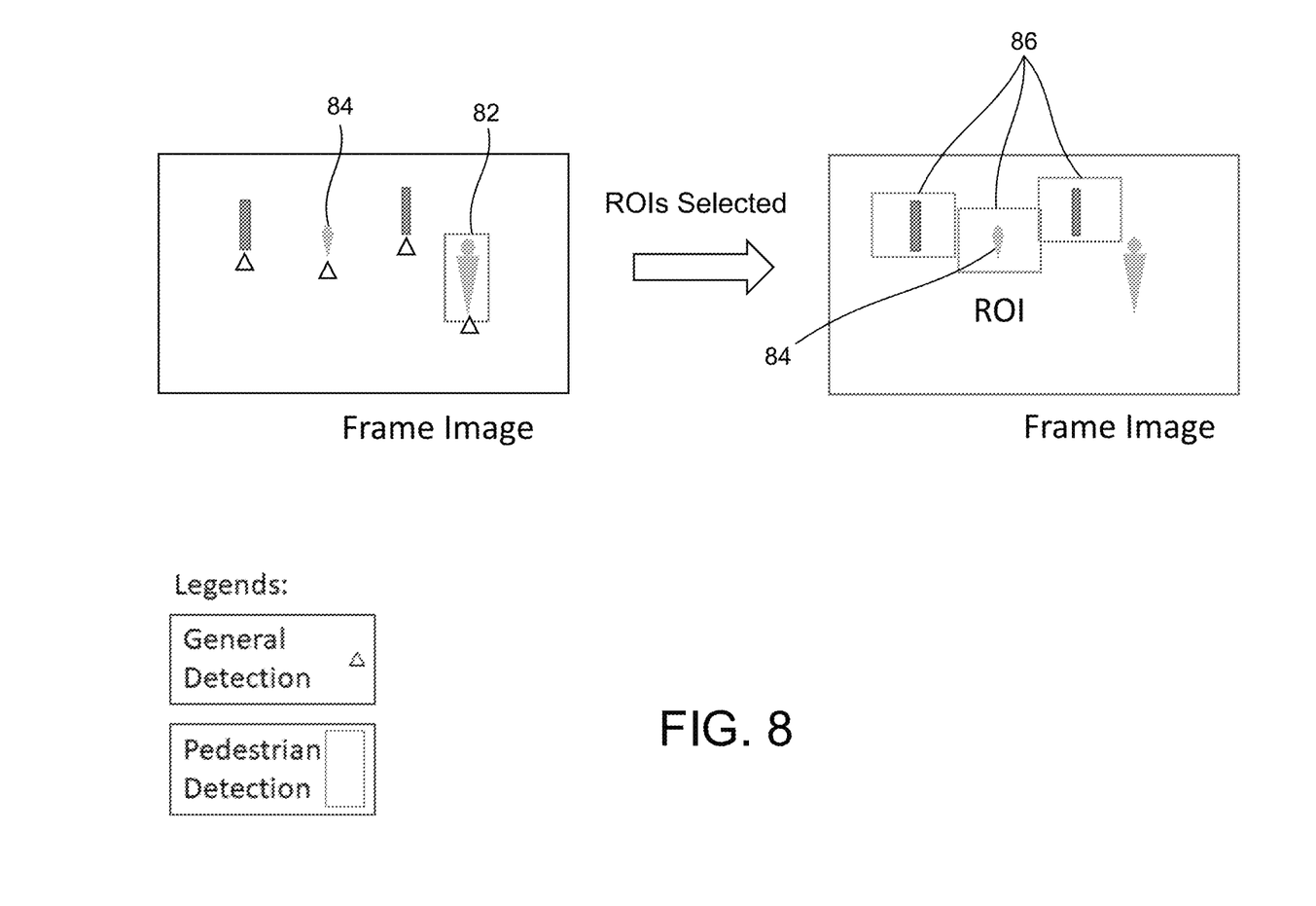
FIG. 8 is a schematic view of selecting regions of interest in a frame of image data in accordance with the present invention.

Referring now to FIG. 8, in some situations, a pedestrian 82 close to the vehicle may be detected, using general detection, in a frame of captured image data while a pedestrian 84 at a farther distance from the vehicle (and thus farther from the camera) may not be initially detected due to the small template size. Here, the system may select one or more ROIs 86 which have an increased potential to include a pedestrian. Because the pedestrian 82 is already detected, the detected pedestrian 82 may be excluded from the selected ROIs 86.

Figure 9:
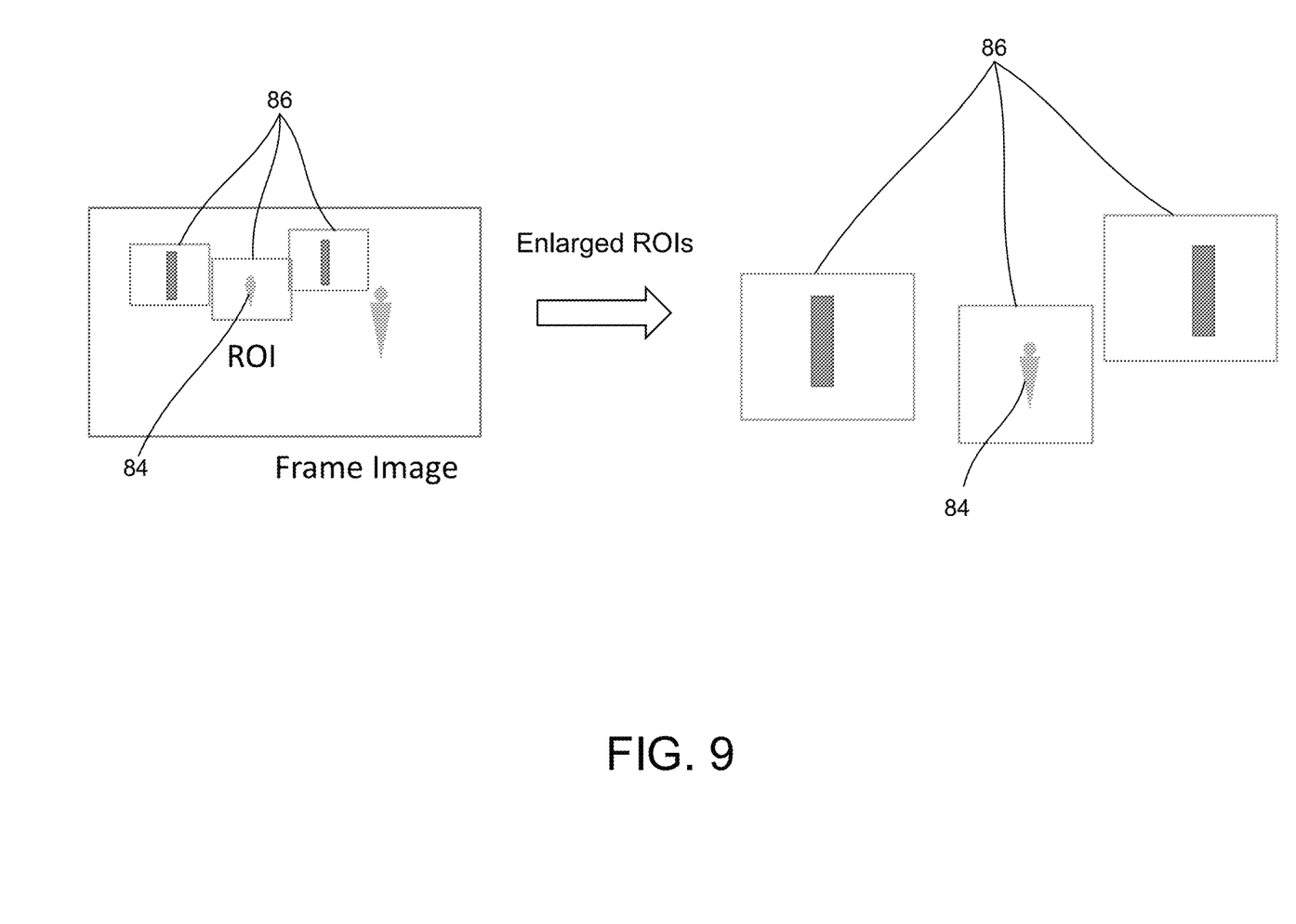
FIG. 9 is a schematic view of enlarging regions of interest selected in FIG. 8 in accordance with the present invention.
Figure 10:
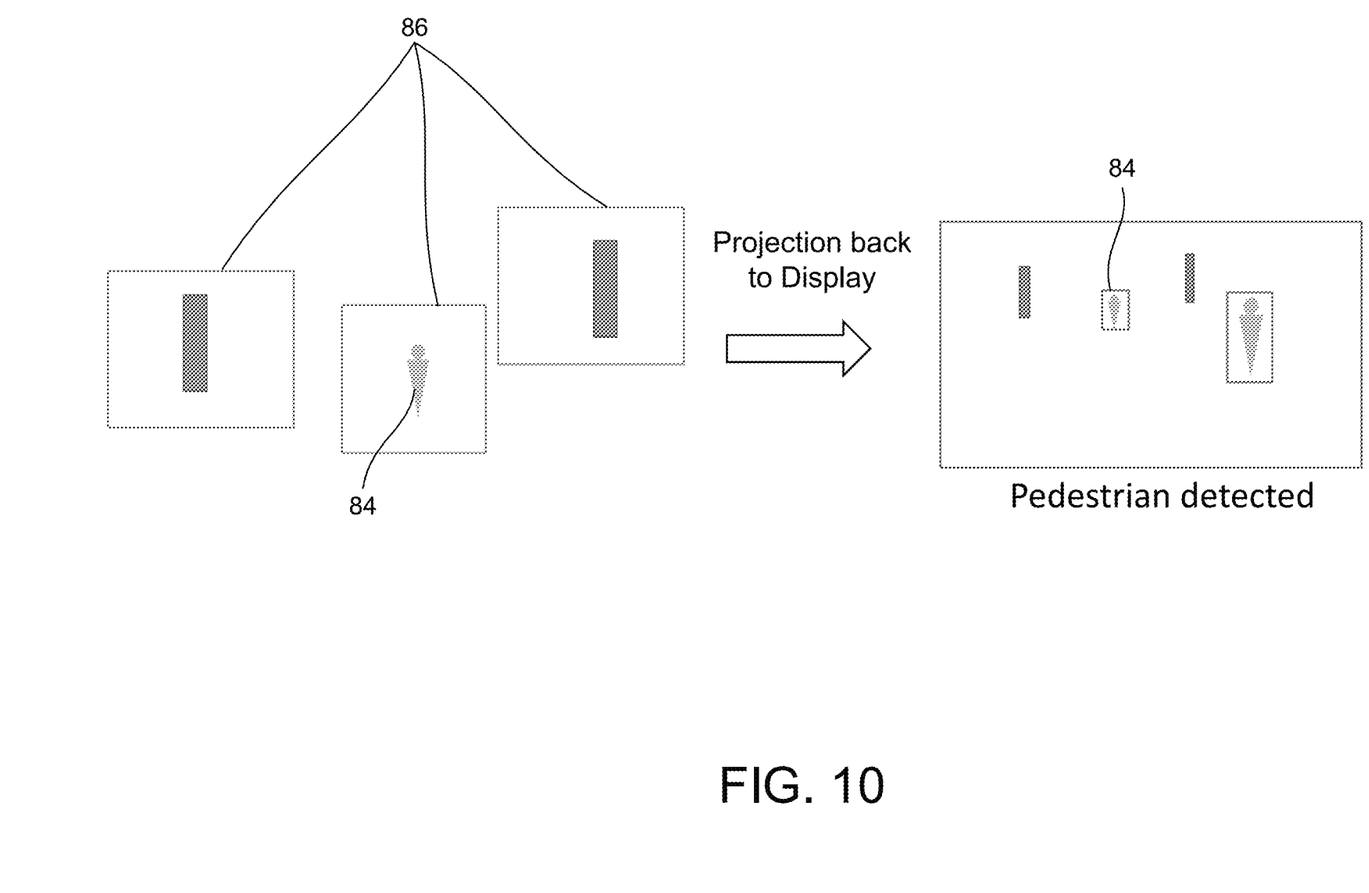
FIG. 10 is a schematic view of detecting a pedestrian in the regions of interest enlarged in FIG. 9 in accordance with the present invention.

Referring now to FIGS. 9 and 10, the system may enlarge each of the selected ROIs 86 (FIG. 9) and then run pedestrian detection on each of the enlarged ROIs 86. After executing pedestrian detection on each of the enlarged ROIs 86, the pedestrian 84 farther from the vehicle is detected and identified or classified as a pedestrian (FIG. 10).

Thus, the vehicle vision system uses local enhancement to increase detection range that otherwise is limited by camera resolution. Because local enhancement does not need higher camera resolution, it does not need hardware with higher cost and complexity. Local enhancement finds regions of interest to scan for farther or more distant targets, which requires significantly less time than scanning an entire enlarged image. The system may be used to increase the range of detection for all 2-D and 3-D objects, e.g., vehicles, bicycles, trailers, road markings, traffic lights, traffic signs, etc. Thus, local enhancement performed by the vision system is able to have better detection (and identification or classification of detected objects) by using a lower resolution camera and less costly hardware and continue to maintain system operation speed.

Each camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276;

US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
    a camera disposed at a vehicle equipped with the vehicular vision system and viewing exterior of the vehicle, the camera capturing image data;
    an electronic control unit (ECU) comprising electronic circuitry and associated software;
    wherein the electronic circuitry of the ECU comprises an image processor for processing image data captured by the camera to detect presence of objects in the field of view of the camera;
    wherein the ECU, responsive to detecting presence of at least one object via processing by the image processor of image data captured by the camera, determines whether any pedestrian candidate regions are present within a frame of captured image data;
    wherein the ECU generates at least one cropped image portion from the frame of captured image data;
    wherein the ECU generates an enlarged cropped image for each of the at least one cropped image portion that has an increased resolution as compared to the resolution of the respective cropped image portion;
    wherein the ECU, via processing by the image processor of the at least one enlarged cropped image, determines whether any pedestrian candidate regions are present in any of the at least one enlarged cropped image;
    wherein the ECU, when determining whether any pedestrian candidate regions are present within the frame of captured image data, generates a reduced resolution frame of captured image data that has a reduced resolution as compared to a resolution of the captured frame of image data, and wherein the ECU determines whether any pedestrian candidate regions are present within the reduced resolution frame of captured image data; and
    wherein the ECU determines that a pedestrian is present within the frame of captured image data responsive to determining that a pedestrian candidate region is present within the frame of captured image data or that a pedestrian candidate region is present within one or more of the at least one enlarged cropped image.

2. The vehicular vision system of claim 1, wherein the ECU determines whether any pedestrians are present based on non-maximum suppression.

3. The vehicular vision system of claim 1, wherein the ECU generates the at least one cropped image portion based on pre-set view angles.

4. The vehicular vision system of claim 3, wherein the at least one cropped image portion comprises three cropped image portions.

5. The vehicular vision system of claim 4, wherein the three cropped image portions comprise a center third of the frame of captured image data.

6. The vehicular vision system of claim 4, wherein the ECU, responsive to processing by the image processor of image data captured by the camera, determines one or more regions of interest within a frame of captured image data, and wherein the ECU generates an enlarged region of interest image for each determined region of interest, and wherein the ECU performs pedestrian detection on each enlarged region of interest to determine whether a pedestrian is present in the associated region of interest.

7. The vehicular vision system of claim 1, wherein, in order to determine whether any pedestrian candidate regions are present within a frame of captured image data, the ECU performs multiscale pedestrian detection on the frame of captured image data.

8. The vehicular vision system of claim 7, wherein the ECU performs multiscale pedestrian detection on each of the at least one cropped image portion.

9. The vehicular vision system of claim 1, wherein the ECU determines a pedestrian is present within the frame of captured image data when at least one of the pedestrian candidate regions has a score that exceeds a threshold.

* * * * *